United States Patent [19]

Greskovich et al.

[11] Patent Number: 4,769,353

[45] Date of Patent: Sep. 6, 1988

[54] STRONTIUM-CONTAINING YTTRIUM OXIDE CERAMIC BODY

[75] Inventors: Charles D. Greskovich, Schenectady; Chester R. O'Clair, Latham, both of N.Y.

[73] Assignee: General Electric Company, Schenectady, N.Y.

[21] Appl. No.: 926,934

[22] Filed: Nov. 4, 1986

[51] Int. Cl.$^4$ ............................................. C04B 35/50
[52] U.S. Cl. .................... 501/126; 501/152; 264/1.2; 264/65
[58] Field of Search ............... 501/152, 126; 423/263; 264/1.2, 65

[56] References Cited

U.S. PATENT DOCUMENTS

| | | |
|---|---|---|
| 1,371,741 | 3/1921 | Dietsche ............................ 423/263 |
| 3,179,492 | 4/1965 | Smoot et al. ....................... 423/263 |
| 3,180,741 | 4/1965 | Wainer et al. ...................... 423/263 |
| 3,764,643 | 10/1973 | Muta et al. ........................ 501/152 X |
| 4,098,612 | 7/1978 | Rhodes et al. ..................... 501/152 |
| 4,166,831 | 9/1979 | Rhodes et al. ..................... 501/152 X |

FOREIGN PATENT DOCUMENTS

| | | | |
|---|---|---|---|
| 2056763 | 5/1971 | Fed. Rep. of Germany ...... | 501/152 |
| 414227 | 2/1974 | U.S.S.R. ............................ | 501/126 |

Primary Examiner—William R. Dixon, Jr.
Assistant Examiner—Ann M. Knab
Attorney, Agent, or Firm—Jane M. Binkowski; James C. Davis, Jr.; James Magee, Jr.

[57] ABSTRACT

A polycrystalline body having a composition comprised of $Y_{2-x}Sr_xO_{3-x/2}$ wherein x ranges from about 0.0015 to about 0.012.

22 Claims, 1 Drawing Sheet

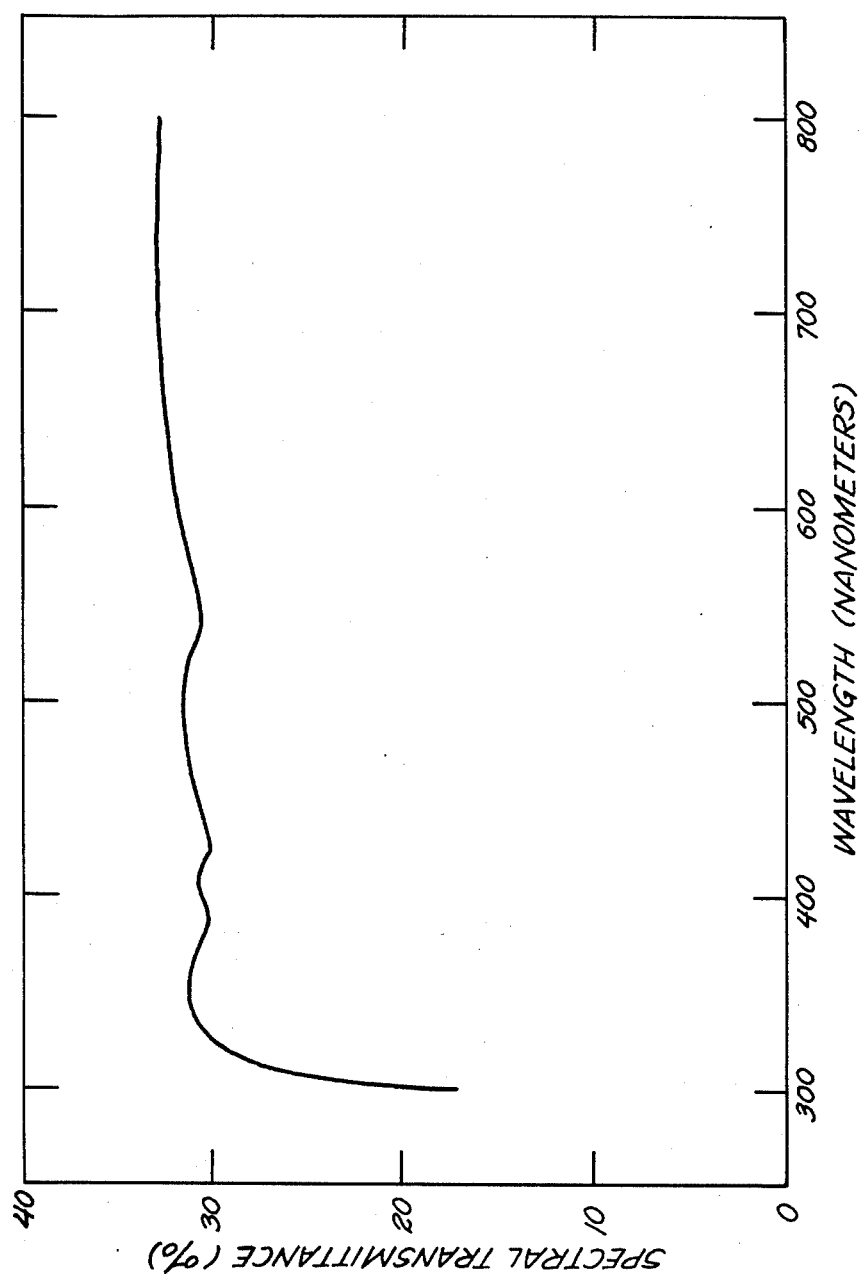

STRONTIUM-CONTAINING YTTRIUM OXIDE CERAMIC BODY

This invention relates to the production of a polycrystalline yttrium oxide body which contains strontium in solid solution. In one particular aspect, this invention relates to the production of an optically translucent or transparent strontium-containing yttrium oxide body.

Yttrium oxide ($Y_2O_3$) has been long considered to be an excellent candidate material for high temperature lamp envelopes, provided an economical process could be used to prepare translucent or transparent bodies without darkening in the reducing conditions of a typical sodium vapor discharge lamp. The provision of economical thin-walled tubing required for this application necessitates the use of a sintering process.

U.S. Pat. No. 3,878,280 to Dutta et al. discloses vacuum hot pressing of yttrium oxide powder without additives in a graphite die at 1300° C. to 1500° C. to produce transparent yttrium oxide having an ultrafine grain size of less than 1 micron.

U.S. Pat. No. 3,545,987 to Anderson discloses the preparation of transparent $Y_2O_3$-based ceramics containing $ThO_2$, $ZrO_2$ or $HfO_2$ as sintering additives. These compositions make a cubic solid solution of high transparency, but they have a strong tendency to darken within several hours during use as lamp envelopes in a sodium vapor discharge lamp. This darkening problem cannot be tolerated with these $Y_2O_3$ solid solutions because these materials eventually become totally absorbing in the visible region and useless during lamp operation.

U.S. Pat. No. 3,873,657 to Toda et al. discloses the use of beryllium additives to prepare transparent $Y_2O_3$-based ceramics, but commercialization of this composition is probably not practical because of the toxic nature of the beryllium compounds.

U.S. Pat. No. 4,147,744 to Rhodes discloses a sintering process for producing a substantially transparent $Y_2O_3$-based body of $Y_2O_3$ and lanthana ($La_2O_3$). These compositions can be sintered to transparency by a special high temperature (1900-2150° C.) heat treatment which makes use of the cubic-to-hexagonal phase transition responsible for retarding grain growth and enhancing sintering. This patent also discloses that lanthana and yttria precursors such as co-precipitated oxalates, carbonates, hydroxides and organic carboxylates may be used.

U.S. Pat. No. 4,174,973 to Rhodes discloses the incorporation of 0.1 to 5 wt. % of MgO or $MgAl_2O_4$ as a sintering aid to $Y_2O_3$ to make transparent $Y_2O_3$-based ceramics containing 0.1 to 5 wt. % of MgO or $MgAl_2O_4$. The trivalent ($Al^{3+}$) and/or divalent ($Mg^{2+}$) additives still permit good chemical stability of these sintered $Y_2O_3$ compositions toward reduction and darkening in high temperature, low oxygen environments such as those present in sodium vapor discharge lamps. However, a disadvantage of these $Y_2O_3$ ceramics containing MgO or $MgAl_2O_3$ is that residual secondary phase(s) remain in the microstructure of the sintered product and can cause an unknown amount of light scattering which degrades the overall optical quality.

U.S. Pat. No. 4,755,492 to Greskovich et al. discloses the production of a sinterable yttrium oxide powder useful for pressureless sintering a compact thereof into an optically translucent or transparent body. The yttrium oxide powder is formed by preparing yttrium oxalate hydrate powder by means of the wet chemical oxalate method, comminuting the yttrium oxalate hydrate powder to a required degree and calcining the yttrium oxalate hydrate.

The present process produces optically translucent or transparent $Y_2O_3$ ceramics with strontium oxide (SrO) as a sintering additive.

Those skilled in the art will gain a further and better understanding of the present invention from the detailed description set forth below, considered in conjunction with the accompanying figure forming a part of the specification which shows spectral transmittance, i.e. in-line transmission, as a function of wavelength for a polished strontium-containing as-sintered body having a composition of $Y_{1.994}Sr_{0.006}O_{2.997}$ produced in accordance with the present invention.

In accordance with the present invention, a powder comprised of a mixture and/or solid solution of yttrium oxide and strontium oxide is formed, shaped into a compact and pressureless sintered to produce a polycrystalline body which is at least optically translucent and preferably which is optically transparent.

By pressureless sintering herein it is meant the densification or consolidation of the compact without the application of mechanically applied pressure into a ceramic body which is at least optically translucent.

The terms "translucency" and "transparency" as used herein denote various degrees of optical clarity of the present sintered product.

By an optically translucent body it is meant herein a body through which light or radiation in the visible wavelength is able to pass through sufficiently to make such body useful for optical applications such as enclosures for arc tubes.

By an optically transparent body, it is meant herein a body through which light or radiation in the visible wavelength is able to pass through sufficiently so that an object on the other side can be seen distinctly with the unaided eye, i.e., it is a body which can be seen through.

Briefly stated, the present process is directed to producing a closed-pore sintered strontium-containing yttrium oxide body by producing a forming powder comprised of a mixture and/or solid solution of yttrium oxide and strontium oxide, said strontium oxide ranging from about 0.15 mole % to about 1.2 mole % of said forming powder, shaping said forming powder into a compact having a density of at least about 45% of the density for yttrium oxide and firing said compact in an atmosphere of hydrogen to a temperature ranging from about 1625° C. to about 2000° C. for a time sufficient to produce said sintered body.

Briefly stated, in one embodiment, the present process is directed to producing a sintered strontium-containing yttrium oxide body which is at least optically translucent by producing a forming powder comprised of a mixture and/or solid solution of yttrium oxide and strontium oxide, said strontium oxide ranging from about 0.15 mole % to about 1.2 mole % of said forming powder, shaping said forming powder into a compact having a density of at least about 45% of the density for yttrium oxide, firing said compact to a temperature ranging from about 1625° C. to about 2000° C. for a time sufficient to produce said sintered body, and decreasing the firing temperature at a rate which has no significant deleterious effect on said sintered body, said firing being carried out in an atmosphere of hydrogen, said hydrogen atmosphere containing at least a sufficient partial pressure of oxygen at least when said compact becomes a closed pore body to produce said optically translucent sintered body.

In carrying out the present process, the forming powder, i.e. Y-Sr oxide powder, comprised of a mixture and/or solid solution of yttrium oxide and strontium oxide can be produced by a number of techniques. The forming powder contains strontium oxide in some form in an amount ranging from about 0.15 mole % to about 1.2 mole %, preferably from about 0.3 mole % to about 1.2 mole % and more preferably from about 0.3 mole % to about 0.8 mole %, of the forming powder. Preferably, the strontium oxide is distributed in the forming powder in some form in a uniform or at least a substantially uniform manner.

Preferably, the wet chemical oxalate method is used to produce a coprecipitate composed of an oxalate hydrate of yttrium and strontium, i.e. Y-Sr oxalate hydrate, containing strontium in a predetermined amount based on the amount of strontium oxide desired in the forming powder, and the oxalate hydrate is then calcined to produce the desired forming powder.

In the wet chemical oxalate method, yttrium nitrate solution and strontium nitrate solution are admixed with oxalic acid solution to coprecipitate Y-Sr oxalate hydrate.

The yttrium nitrate solution can vary in concentration and generally ranges from about 0.5 moles to about 3 moles of yttrium, preferably about 1 mole of yttrium, per liter of solution. The yttrium nitrate solution can be formed by a number of conventional techniques. Preferably, it is formed by dissolving yttrium oxide powder, preferably having a purity of at least about 99.9% or higher, in a mixture of distilled or deionized water and concentrated nitric acid. Alternatively, the yttrium nitrate solution can be formed by dissolving yttrium nitrate, preferably having a purity of at least about 99.9% or higher, in distilled or deionized water.

The strontium nitrate solution can be formed in substantially the same manner as the yttrium nitrate solution except that its concentration generally depends on the amount of strontium oxide required in the forming powder.

The oxalic acid solution can be formed by dissolving oxalic acid preferably having a purity of at least about 99.9% or higher in distilled or deionized water. The oxalic acid solution can vary in concentration and generally it ranges from about 0.5 to about 1.0 mole of oxalic acid, preferably about 0.8 mole, per liter of solution. Preferably, oxalic acid in excess of that stoichiometrically required to complete reaction is used to ensure complete reaction.

The solutions of yttrium nitrate, strontium nitrate and oxalic acid are admixed to precipitate Y-Sr oxalate hydrate. Such mixing can be carried out in a conventional manner and can be carried out at ambient pressure and temperature.

By ambient pressure herein, it is meant atmospheric or about atmospheric pressure.

By ambient temperature herein, it is meant at or about room temperature, i.e. at or about 21° C.

The Y-Sr oxalate hydrate can be recovered by a number of conventional techniques. Preferably, it is collected into a filter cake by centrifuging or by vacuum filtration. The Y-Sr oxalate hydrate is washed generally with distilled or deionized water or methyl alcohol to remove acid therefrom to produce a substantially neutralized material, i.e. a material generally having a pH ranging from about 5 to about 7. The neutralized material can be collected in a conventional manner, preferably by vacuum filtration or centrifuging.

The collected neutralized material is dried preferably in air to remove excess water therefrom, i.e., water physically adsorbed thereon. Typically, it is dried in flowing air at a temperature ranging from about 90° C. to about 125° C. for a period of time determinable empirically generally ranging from about 12 hours to about 24 hours.

The dried Y-Sr oxalate hydrate is a white fluffy powder and is comprised of agglomerates. X-ray diffraction analysis of the Y-Sr oxalate hydrate powder indicates that it has some degree of crystallinity.

The Y-Sr oxalate hydrate powder is thermally decomposed, i.e. calcined, to produce the present forming powder, i.e. Y-Sr oxide powder. Calcining of the Y-Sr oxalate hydrate powder is preferably carried out in air at ambient pressure at a temperature ranging from about 650° C. to about 1000° C., preferably from about 750° C. to about 850° C., and most preferably it is about 800° C. At a temperature below about 650° C., the decomposition of the precursor may not be complete, and above 1000° C., large hard aggregates may form that can reduce translucency. Calcining time is determinable empirically, for example, by weight loss. Calcining is completed when there is no more weight loss on further firing. Generally, calcining time ranges from about one hour to about four hours. Generally, in the resulting calcined powder, the strontium oxide is in solid solution, or it is at least partly in solid solution, in the yttrium oxide powder.

The present forming powder, i.e. Y-Sr oxide powder, is crystalline. Generally, it has a purity of at least about 99.9% and higher, preferably at least about 99.99%, and most preferably greater than about 99.99%.

% purity herein denotes % by weight.

Preferably, the present Y-Sr oxide powder is free of particles greater than about 10 microns in size and more preferably free of particles greater than about 5 microns.

The present Y-Sr oxide poder generally has a specific surface area ranging from about 4 to about 25 square meters per gram, preferably from about 5 to about 15 square meters per gram, and typically, it ranges from about 6 to about 10 square meters per gram.

By specific surface area or surface area of a powder herein, it is meant the specific surface area according to BET surface area measurement.

A number of techniques can be used to shape the Y-Sr oxide powder into a compact. For example, it can be extruded, injection molded, die-pressed, isostatically pressed or slip cast to produce the compact of desired shape. The compact can vary in form and size and can be simple, hollow and/or complex shape. Any lubricants, binders or similar materials used in shaping the powder should have no significant deleterious effect on the resulting sintered body. Such materials are preferably of the type which evaporate on heating at relatively low temperatures, preferably below 500° C., leaving no significant residue. The compact should have a density of at least about 45%, preferably greater than about 45%, more preferably greater than about 50% and most preferably greater than about 55% of the theoretical density of 5.03 g/cc for yttrium oxide to promote densification during sintering and achieve attainment of the present optically translucent sintered body.

The compact is fired in an atmosphere of hydrogen to produce the present sintered body. At least at some stage of the firing of the body, the hydrogen atmosphere should be provided with at least a sufficient oxygen partial pressure to produce and maintain the present optically translucent sintered body. Such oxygen partial pressure is determinable empirically. Generally, the firing or sintering atmosphere is at or about ambient pressure.

In one embodiment of the present invention, the compact is fired in an atmosphere of wet hydrogen to produce the present sintered body. The wet hydrogen atmosphere should contain at least a sufficient partial pressure of oxygen to produce and maintain the present optically translucent or transparent body, i.e. to prevent discoloration of the sintered body in the present process, and is determinable empirically. Specifically, the wet hydrogen atmosphere is chosen to be reducing to the furnace elements which might be tungsten or molybdenum in a refractory metal furnace and should be slightly oxidizing to the sample being sintered so that it will not be discolored or darkened by too low an oxygen partial pressure, i.e. too much of a reducing atmosphere. Such a wet hydrogen atmosphere can be provided by incoming hydrogen gas having a dewpoint temperature ranging from about 0° C. to about 25° C., and preferably from about 15° C. to about 22° C. Such incoming wet hydrogen gas determines how much oxygen will be in the furnace atmosphere at any particular firing temperature. In the present sintering temperature range, the oxygen partial pressure in the sintering atmosphere generally ranges from about $10^{-8}$ to about $10^{-13}$ atmospheres.

In another embodiment of the present process, the green or prefired compact is fired initially in an atmosphere of dry hydrogen until the sintered body becomes at least a closed pore body followed by firing in an atmosphere of wet hydrogen. Generally, the present dry hydrogen atmosphere is provided by incoming hydrogen gas having a dewpoint temperature ranging from about −50° C. to about −60° C. Generally, the present dry hydrogen atmosphere has an oxygen partial pressure at sintering temperature of less than about $10^{-20}$ atmosphere. When the sintering body becomes a closed pore body, at which point it typically has a density ranging from about 92% to about 96%, or preferably when the sintered body has a density higher than that of the closed pore body, more preferably when the sintered body has a density of at least about 99%, and most preferably when the sintered body has a density greater than about 99.9%, an atmosphere of wet hydrogen is introduced. The wet hydrogen atmosphere is used to remove or substantially remove discoloration of the sintered body caused by firing in dry hydrogen and to complete any remaining sintering of the body. Therefore, such a wet hydrogen atmosphere should contain at least a sufficient partial pressure of oxygen to remove or at least substantially remove the discoloration of the sintered body caused by dry hydrogen, i.e. to produce and maintain the present optically translucent or transparent body, and is determinable empirically. Generally, such a wet hydrogen atmosphere can be provided by incoming hydrogen gas having a dewpoint temperature ranging from about 0° C. to about 25° C., preferably from about 15° C. to about 22° C. Generally, a sintered body with significant increased clarity is produced by firing initially in the dry hydrogen atmosphere to the closed pore stage followed by the firing in wet hydrogen.

The present sintering temperature, i.e. maximum firing temperature, ranges from about 1625° C. to about 2000° C., and preferably from about 1700° C. to about 1950° C. Sintering temperatures lower than about 1625° C. either would require too long a period of sintering time to be practical or are not operable to produce the present product. On the other hand, temperatures higher than about 2000° C. produce a sintered body with no significant advantages in optical quality but with the disadvantage of grains that are too large thereby rendering it with poor strength.

The rate of heating to sintering temperature can vary and should have no significant deleterious effect on the body. Generally, heating rates can range from about 100° C. per hour up to about 700° C. per hour, and usually from about 200° C. per hour to about 400° C. per hour. An intermediate soak time of about 5 to 10 hours at temperatures between 1700 and 1800° C. has been found useful in providing sintered bodies with high translucency/transparency. This intermediate soaking period is carried out in the sintering furnace during the sintering cycle, unless sintering temperatures are lower than about 1700° C.

The particular time period at the maximum firing temperature depends largely on such temperature and is determinable empirically. Specifically, increasing sintering or firing temperature requires less sintering or firing time. Generally, however, where only a wet hydrogen atmosphere is used, a sintering temperature of about 1700° C. requires a sintering time period of about 8 hours, and a sintering temperature of about 1950° C. requires a sintering time period of about 2 hours to produce the present sintered body.

The sintered body is cooled, i.e. the firing temperature is decreased, preferably to ambient temperature, under conditions which have no significant deleterious effect thereon. Preferably it is cooled in a wet hydrogen atmosphere, i.e. an atmosphere provided by incoming hydrogen gas having a dewpoint temperature ranging from about 0° C. to about 25° C. Generally, cooling rate is less than about 1500° C. per hour, and usually ranges from about 500° C. per hour to about 1000° C. per hour.

The present sintered body has a composition comprised of $Y_{2-x}Sr_xO_{3-x/2}$ wherein x ranges from about 0.0015 to about 0.012. In one embodiment x ranges from about 0.003 to about 0.012, and in another embodiment, x ranges from about 0.003 to about 0.008.

The present sintered body is comprised of a solid solution of strontium oxide in yttrium oxide. The present sintered body has a microstructure with an average grain size generally ranging from about 5 microns to about 250 microns. In one embodiment, the present sintered body has an average grain size ranging from about 25 microns to about 100 microns and in another embodiment the average grain size ranges from about 25 microns to about 50 microns. The grains are cubic in symmetry, as ascertained by X-ray diffraction studies.

The present sintered body is a closed pore body. Generally, it has a density of at least about 99.7%, usually at least about 99.8%, preferably at least about 99.9%, and more preferably greater than about 99.9%.

In the present invention, unless otherwise stated, the density of the sintered body as well as that of the unsintered compact is given as a fractional density of the theoretical density of yttrium oxide (5.03 g/cc).

In one embodiment, the present sintered body is at least optically translucent and preferably optically transparent. More specifically it has an in-line spectral transmission at least greater than 1%, preferably at least about 2%, more preferably at least about 3%, still more preferably at least about 10%, and most preferably at least about 20%, all values taken at wavelength of 500 nanometers at a thickness of 1.15 millimeters. In this embodiment of the present invention, at an in-line spectral transmission of about 2% taken at a wavelength of 500 nanometers at a thickness of 1.15 millimeters, the polished sintered body is optically transparent.

By the term "in line spectral transmission" used herein, it is meant the ratio of the intensity of transmitted light to the intensity of incident light, obtained when parallel light of a certain intensity is incident perpendicular to the polished surfaces of a sample of a certain thickness.

The present invention makes it possible to fabricate simple, hollow and/or complex shaped polycrystalline yttrium oxide articles directly. Specifically, the present sintered product can be produced in the form of a useful simple, hollow and/or complex shaped article without machining, or without significant or substantial machining, such as thin walled tube, a long rod, a spherical body or a hollow shaped article.

The present sintered body has a wide variety of uses. It is useful in any system where a ceramic protective material or plate having the present light-transmitting properties is needed. Specifically, it is useful as a light-transmitting filter or light-transmitting window for infrared domes and solar cells. It is especially useful as a lamp envelope for a metal vapor discharge lamp such as a sodium vapor discharge lamp. Such a lamp envelope usually has a wall thickness ranging from about $\frac{1}{2}$ to about 1 millimeter.

The invention is further illustrated by the following examples wherein the procedure and materials were as follows unless otherwise stated:

Starting oxide powder compositions of $Y_2O_3$ (Example 1), $Y_2O_3 + 0.15$ mole % SrO (Example 2), $Y_2O_3 + 0.3$ mole % SrO (Examples 3 and 4), $Y_2O_3 + 0.6$ mole % SrO (Example 5) and $Y_2O_3 + 1.2$ mole % SrO (Example 6) were prepared by the wet chemical oxalate hydrate precipitation process followed by thermal decomposition of the yttrium oxalate hydrate powder in Example 1 and the Y-Sr oxalate hydrate powder in Examples 2 to 6 to the corresponding oxide powder.

Specifically, in Example 3 of Table I, 0.028 gram of 99.99% pure $Sr(NO_3)_2$ was dissolved in 65 cc of distilled water and then to the resulting solution there was added 9.986 grams of 99.99% pure $Y_2O_3$ and 17.5 cc of concentrated nitric acid. The mixture was stirred while heat was applied until the solution was clear. This nitrate solution was then concentrated by boiling to a final volume of 50 cc. In a separate beaker 25 g of oxalic acid was dissolved in 300 cc of distilled water until a clear solution was obtained. Both clear solutions were separately filtered under vacuum using a Whatman No. 50 filter paper. The Y-Sr nitrate solution was then dripped into the oxalic acid solution at 4° C. to form a finely-divided, Y-Sr oxalate hydrate coprecipitate. The precipitate was recovered and washed repeatedly with distilled water immediately after precipitation was completed. This oxalate hydrate precipitate was washed with about 11 liters of water to remove residual acid. After washing, the precipitate was collected by vacuum filtration and dried for about 12 hours at 90°–100° C. in a drying oven producing a powder having an average agglomerate size of 2.6 $\mu$m.

In Example 3, the dried oxalate hydrate powder was thermally decomposed to the oxide form by heating in flowing air (~1–2 SCFPH) at ambient pressure at 820° C. for 2 hours producing 10 grams of powder comprised of $Y_2O_3$ containing 0.3 mole % of SrO.

In Examples 1, 2 and 4–6, the oxide powders were produced in substantially the same manner as in Example 3 except as noted herein and in Table I. Specifically, in Example 1 no strontium nitrate solution was used and in Examples 2, 5 and 6, the solutions were tailored to produce a Y-Sr oxalate hydrate which, when thermally decomposed, would produce an oxide powder with the given amount of SrO. In Example 5, the average agglomerate size of the dried Y-Sr oxalate hydrate powder was 2.9 $\mu$m, the average particle size of the resulting oxide powder was 1.3 $\mu$m and the oxide powder had a specific surface area of 6.2 meters squared per gram.

In Example 4, the dried Y-Sr oxalate hydrate powder was dry ball-milled in a plastic jar with 1 wt % stearic acid as a grinding aid using $Y_2O_3$ grinding media at ambient temperature for 1 hour. 4.3 grams of the milled powder was calcined for 1 hour in flowing air at ambient pressure at 800° C. to burn out the stearic acid and thermally decompose the oxalate hydrate to form the oxide. The average particle size of the oxide powder was 1.1 $\mu$m and it had a specific surface area of 6.7 meters squared per gram.

Size distribution of the powders was determined on a Horiba Model #CAPA-500 particle analyzer. All size analyses were carried out in the same manner.

The oxide powder of each composition was formed into a compact, i.e. disk, in substantially the same manner at ambient temperature to produce compacts of substantially the same size having a density ranging from about 53% to about 55% of theoretical density. Specifically, 1.5 grams of the oxide powder was die pressed in a 2.54 cm die into a disk under a pressure of about 28 MPa and then isostatically pressed at 210 MPa.

Firing and sintering of the compact was carried out in a tungsten resistance furnace.

The compact was placed on a tungsten setter in the furnace and sintered on a sintering schedule. Specifically, in all of the examples, the compact was heated at a rate of about 350° C. per hour to 1770° C., held for 10 hours at 1770° C., then heated at a rate of about 40° C. per hour to 2000° C. where it was held for 2 hours, and then cooled at a rate of about 1000° C. per hour to ambient temperature.

All of the examples in Table I were carried out in an atmosphere of wet hydrogen at or about ambient pressure.

The furnace was provided with a wet hydrogen atmosphere by incoming hydrogen gas having a dewpoint temperature ranging from about 20° C. to about 22° C.

The flow rate of incoming hydrogen gas was about 10 cubic feet per hour.

Density of the sintered body was determined before it was polished and was determined by water displacement using Archimedes method.

Each sintered disk was about 2 cm in diameter.

Each sintered disk was polished in a standard manner using 0.3 micron aluminum oxide paste. Each disk was polished so that both of its large faces were substantially smooth, flat and parallel to each other. The final thickness of each polished disk is given in Table I.

Spectral transmittance, i.e. in-line spectral transmission, of the polished disks was measured as a function of wavelength in a standard manner on a Perkin-Elmer Model 330 spectrometer. For comparative purposes the spectral transmittance at a wavelength of 500 nanometers in the visible region is given for the Examples in Table I. In Example 5, the entire spectral transmittance curve is given as a function of wavelength.

Specifically, spectral transmittance in Table I is the relative intensity of light exiting the back face of the flat disk along the initial beam direction as compared to the initial light intensity impinging on the front face of the disk.

The sintered disks were characterized by X-ray diffraction, X-ray fluorescence, density measurements and optical evaluation.

The composition $Y_{2-x}Sr_xO_{3-x/2}$ in Table I shows the value of x, i.e. the strontium concentration, in the sintered disk and is based on the initial starting composition.

Average grain size of the sintered body was determined in a standard manner. Specifically, the polished disk was chemically etched with a boiling solution of 50% hydrochloric acid and water for 30 seconds to reveal the grains. The average grain size was then determined by the lineal intercept method.

The examples are illustrated in Table I.

TABLE I

| Example | Oxide Composition (Mole % SrO in Y—Sr oxide powder) | % Theoretical Density | Polished Disk Thickness (mm) | Optical Quality | % Spectral Transmittance (500 nm) | Composition $Y_{2-x}Sr_xO_{3-x/2}$ |
|---|---|---|---|---|---|---|
| 1 | 0 | 99.6 | 0.8 | Opaque | 0.1 | 0 |
| 2 | 0.15 | 99.8 | 1.3 | Translucent | — | 0.0015 |
| 3 | 0.3 | 99.9 | 1.3 | Transparent | 8 | 0.003 |
| 4 | 0.3 | 99.9 | 1.15 | Transparent | 23 | 0.003 |
| 5 | 0.6 | 99.9 | 1.15 | Transparent | 31 | 0.006 |
| 6 | 1.2 | 99.9 | 1.15 | Transparent | 15 | 0.012 |

X-ray diffraction showed that the SrO dissolved into the $Y_2O_3$ lattice to form cubic solid solutions. The lattice parameter of the cubic solid solutions increased from $10.6034 + 0.0003$ Å for pure $Y_2O_3$ to ($10.6055 \pm 0.0004$ Å for $Y_2O_3$ containing 1.2 mole % SrO in solid solution. The determination of residual strontium concentration in the sintered disks by X-ray fluorescence showed that the residual strontium concentration increased with increasing amounts of SrO added to the starting composition.

Examples 2-6 illustrate the present invention. Example 2 shows that for a sintered composition when x=0.0015, the disk was optically translucent, and Examples 3-6 show that for sintered compositions where x ranges from 0.0003 to 0.012, the disks were optically transparent. The spectral transmittance of the polished disk of Example 5 as a function of wavelength is illustrated in the accompanying figure which shows its high optical transmission over the visible wavelength. The sintered bodies produced in Examples 2-6 have a wide variety of uses and are especially useful as lamp envelopes, especially as lamp envelopes for sodium vapor discharge lamps.

The average grain size of the sintered disk in Example 1 was 18 microns, in Example 3 it was about 70 microns and in Example 5 it was about 110 microns.

What is claimed is:

1. A process for producing a closed-pore sintered body consisting essentially of a solid solution of strontium oxide in yttrium oxide which consists essentially of forming a powder consisting essentially of a mixture and/or solid solution of yttrium oxide and strontium oxide, said strontium oxide ranging from about 0.15 mole % to about 1.2 mole % of said powder, forming said powder into a compact having a density of at least about 45% of the density of yttrium oxide, an firing said compact in an atmosphere of hydrogen at a temperature ranging from about 1625° C. to about 2000° C. for a time sufficient to produce said sintered body.

2. The process according to claim 1 wherein said atmosphere is wet hydrogen.

3. The process according to claim 1 wherein said firing is initially carried out in an atmosphere of dry hydrogen to produce a closed pore body, then said firing is carried out in an atmosphere of wet hydrogen.

4. The process according to claim 1 wherein said temperature ranges from about 1700° C. to about 1950° C.

5. The process according to claim 1 wherein said strontium oxide ranges from about 0.3 mole % to about 0.8 mole % of said powder.

6. A process for producing a sintered body consisting essentially of a solid solution of strontium oxide in yttrium oxide which is at least optically translucent which consists essentially of preparing a forming powder consisting essentially of a mixture and/or solid solution of yttrium oxide and strontium oxide, said strontium oxide ranging from about 0.15 mole % to about 1.2 mole % of said forming powder, shaping said forming powder into a compact having a density of at least about 45% of the density for yttrium oxide, firing said compact at a temperature ranging from about 1625° C. to about 2000° C. for a time sufficient to produce said sintered body, and decreasing the firing temperature at a rate which has no significant deleterious effect on said sintered body, said firing being carried out in an atmosphere of hydrogen, said hydrogen atmosphere containing at least a sufficient partial pressure of oxygen at least when said compact becomes a closed pore body to produce said optically translucent sintered body.

7. The process according to claim 6 wherein said firing is carried out in an atmosphere of wet hydrogen.

8. The process according to claim 6 wherein said firing is initially carried out in an atmosphere of dry hydrogen to produce a closed pore body, then said firing is carried out in an atmosphere of wet hydrogen.

9. The process according to claim 6 wherein said temperature ranges from about 1700° C. to about 1950° C.

10. The process according to claim 6 wherein said strontium oxide ranges from about 0.3 mole % to about 0.8 mole % of said powder.

11. The process according to claim 6 wherein said sintered strontium-containing yttrium oxide body is optically transparent.

12. A closed-pore polycrystalline body having a composition consisting essentially of $Y_{2-x}Sr_xO_{3-x/2}$ wherein x ranges from about 0.0015 to about 0.012, said body having an average grain size ranging from about 5 microns to about 250 microns, said grains being cubic in symmetry, said body consisting essentially of a solid solution of strontium oxide in yttrium oxide.

13. The body according to claim 12 wherein x ranges from about 0.003 to 0.008.

14. The body according to claim 12 having an average grain size ranging from about 20 microns to about 50 microns.

15. An optically translucent closed-pore polycrystalline body having a composition consisting essentially of $Y_{2-x}Sr_xO_{3-x/2}$ wherein x ranges from about 0.0015 to about 0.012, said body having an average grain size ranging from about 5 microns to about 250 microns, said grains being cubic in symmetry, said body consisting essentially of a solid solution of strontium oxde in yttrium oxide.

16. The optically translucent body according to claim 15 wherein x ranges from about 0.003 to about 0.008.

17. The optically translucent body according to claim 15 having an average grain size ranging from about 25 microns to about 50 microns, said body being in the form of a hollow body having a wall thickness ranging from about ½ to about 1 millimeter.

18. The body according to claim 15 in the form of a lamp envelope.

19. An optically transparent closed-pore polycrystalline body having a composition consisting essentially of $Y_{2-x}Sr_xO_{3-x/2}$ wherein x ranges from about 0.003 to about 0.012, said body having an average grain size ranging from about 5 microns to about 250 microns, said grains being cubic in symmetry, said body consisting essentially of a solid solution of strontium oxide in yttrium oxide.

20. The optically transparent body according to claim 19 wherein x ranges from about 0.003 to 0.008.

21. The optically transparent body according to claim 19 having an average grain size ranging from about 25 microns to about 50 microns, said body being in the form of a hollow body having a wall thickness ranging from about ½ to about 1 millimeter.

22. body according to claim 19 in the form of a lamp envelope.

* * * * *